US 7,764,630 B2

(12) United States Patent
Bunse

(10) Patent No.: US 7,764,630 B2
(45) Date of Patent: Jul. 27, 2010

(54) METHOD FOR AUTOMATICALLY DISCOVERING A BUS SYSTEM IN A MULTIPOINT TRANSPORT NETWORK, MULTIPOINT TRANSPORT NETWORK AND NETWORK NODE

(75) Inventor: Stephan Bunse, Stuttgart (DE)

(73) Assignee: Alcatel, Paris (FR)

( * ) Notice: Subject to any disclaimer, the term of this patent is extended or adjusted under 35 U.S.C. 154(b) by 665 days.

(21) Appl. No.: 11/584,627

(22) Filed: Oct. 23, 2006

(65) Prior Publication Data

US 2007/0115854 A1    May 24, 2007

(30) Foreign Application Priority Data

Oct. 25, 2005   (EP)   ................................. 05292255

(51) Int. Cl.
 *H04L 12/28*   (2006.01)
(52) U.S. Cl. .................. 370/255; 370/252; 370/351
(58) Field of Classification Search ................ 370/252, 370/255, 400, 389, 228, 237, 380, 351
 See application file for complete search history.

(56) References Cited

U.S. PATENT DOCUMENTS

| 7,009,934 | B1 * | 3/2006 | Perkins et al. | ............... 370/228 |
| 2004/0073717 | A1 * | 4/2004 | Cline et al. | ................ 709/250 |
| 2005/0053064 | A1 * | 3/2005 | Wang | ......................... 370/389 |
| 2005/0089027 | A1 * | 4/2005 | Colton | ....................... 370/380 |
| 2005/0169275 | A1 * | 8/2005 | Jiang et al. | .................. 370/392 |
| 2007/0230495 | A1 * | 10/2007 | Li | ............................... 370/412 |

FOREIGN PATENT DOCUMENTS

WO      WO 00/52890 A    9/2000

OTHER PUBLICATIONS

ITU-T G.7714/Y.1705 Generalized automatic discovery for Transport Entities, ITU-T Series G: Transmission System and Media, Digital Systems and Networks; Series Y: Global Information Infrastructure, Internet Protocol Aspects and Next-Generation Networks, "Online! Aug. 2005, XP002359033.
IEEE 802.1AB Working Group: "IEEE 802.1AB: Station and Media Access Control Connectivity Discovery", IEEE 802.1AB IEEE Standard for Local and Metropolitan Area Networks, 'Online! May 6, 2005, pp. 1-58, XP002359034.

* cited by examiner

*Primary Examiner*—Dang T Ton
*Assistant Examiner*—Mandish Randhawa
(74) *Attorney, Agent, or Firm*—Carmen Patti Law Group, LLC

(57) ABSTRACT

A method for automatically discovering a bus system in a multipoint transport network (MTN) is described, which MTN is a two-dimensional arrangement of a plurality of nodes, wherein each node potentially can be logically connected with a plurality of adjacent nodes via a potential link connection. The method includes the steps of placing a first test signal in the GPF layer overhead by the GPF termination functions in order to first gain a relation between all GFP termination functions and the corresponding termination points; deriving the relations between all connection points of the MTN bus by using local knowledge about the status of the GFP adaptation functions, which needs a communication between all nodes of the MTN bus concerning the status of the GFP adaptation functions; and employing an adapted link management protocol (LMP) between all connection points of the MTN bus. Furthermore a multipoint transport network to be used to execute said method, plus a network node to be used in such a multipoint transport network is described.

6 Claims, 2 Drawing Sheets

METHOD FOR AUTOMATICALLY DISCOVERING A BUS SYSTEM IN A MULTIPOINT TRANSPORT NETWORK, MULTIPOINT TRANSPORT NETWORK AND NETWORK NODE

BACKGROUND OF THE INVENTION

The invention is based on the priority application EP 05292255.6 which is hereby incorporated by reference.

The invention relates to a method for automatically discovering a bus system in a multipoint transport network, plus a multipoint transport network to be used to execute said method, plus a network node to be used in said multipoint transport network.

A network can be defined as a physical arrangement of network nodes that can be logical connected with each other by links.

In a point-to-point network each node can be logical connected by a link with one or two adjacent nodes depending on if the node is the first or last node in a network or if it is lying in between the first and the lost node. The node or the nodes a node can be logical connected with, is the one or are the two physical proximate nodes, one in each direction. So a point-to-point network can be seen as a physical one-dimensional arrangement of nodes that can be logically connected with one physically adjacent node in each direction. A bus system in a conventional point-to-point network is the sum of the one-dimensional logical connections, i.e. the links between aligned adjacent nodes. In a point-to-point network knowledge of the links between the nodes automatically leads to the knowledge of the bus system.

A method to discover a bus system in such a point-to-point network is known from ITU-T G.7714/Y.1705 (August 2005).

With raising data traffic network architecture changes from point-to-point networks to multipoint transport networks (MTN). A MTN is not a one-dimensional arrangement of nodes but can be seen as a two-dimensional arrangement of a plurality of nodes. In a MTN each node potentially can be logical connected with a plurality of physically adjacent nodes. So a bus system in a MTN is not a simple addition of links between one-dimensionally aligned adjacent nodes because in a MTN a plurality of physical proximate nodes exists, each one potentially connectable with its proximate nodes by a link, wherein not necessarily each potential link leads to or is required for a desired bus system. Opposite to current point-to-point connections MTN busses provide a multipoint to multipoint connectivity, which will enhance the load of the network.

For future transport of user data streams like e.g. Internet protocol (IP) data streams within MTN it is necessary to automatically discover bus systems that can be seen as a catenation of a number of links within said MTN. Up to now it is not possible to automatically discover a bus system in a MTN because it is not possible to know in advance which catenation of links provides the desired logical connection between a first and a last node.

From WO 00/52890 A1 a method is known for automatically generating a topology of a network having nodes in form of synchronous optical network (SONET) switches. Thereby the nodes or switches in the network pass information about itself to other nodes or switches in the network so that every node or switch can maintain a topology of the network. Using this knowledge of the network topology, each node or switch can generate a communication bus or route within the network and automatically allot bandwidth for the bus or route. Further, each switch may generate a new bus or route in response to a line failure.

The technical purpose of the invention is to develop a method that allows automatically discovering a bus system in a multipoint transport network, plus a multipoint transport network to be used to execute said method, plus a network node of said multipoint transport network. Care should be taken that the automatic discovering is not carried out for a huge network but restricted to the bus system.

DISCLOSURE OF THE INVENTION AND ITS ADVANTAGES

The invention's technical purpose is met by the method according to the teaching of claim 1, the multiport transport network according to the teaching of claim 10 and the network node according to the teaching of claim 11.

Thereby all nodes along the bus act in concert, wherein each node collects information about its conditions, sends that information to the proximate node and receives information about the conditions of the proximate node by an acknowledge message. Thereby the first node in the bus system can only collect information about its conditions and send this information to the second node. The second node when receiving the information from the first node provides the third node with information comprising the conditions of the first and the second node and so on. Doing so, the lost node receives information comprising the conditions of all nodes along the bus. By sending an acknowledge message, the last node provides the information comprising the conditions of all nodes along the bus inclusive the last node to all nodes along the bus inclusive the first node. Doing so it is possible to automatically discover a bus system of a MTN in service. Thereby it is also thinkable that the first node confirms this acknowledge message of the last node that has been received by all nodes along the bus by a second acknowledge message that again will be received by all nodes.

Said method has the advantage over the state of the art, that it allows an automatic discovery process for MTN busses. It is characterized by an interworking of all nodes along the bus.

A preferred embodiment of said method according to the invention is characterized in that each node after discovering its conditions provides information comprising those conditions at least to the proximate nodes, wherein each node that has been provided with such information provides its proximate nodes with information comprising the conditions of that particular node plus the conditions of all nodes information has been received from.

Another preferred embodiment of said method according to the invention is characterized in that exchanging information follows a hierarchy beginning at the first node within said bus system. Preferably exchanging of the information begins from the first node to the last node forming the bus and vice versa. It is also thinkable that the nodes between the first and the last node immediately acknowledge the receipt of a particular information by sending back an information comprising the conditions discovered plus the conditions of other nodes received by similar information.

In a preferred embodiment of the invention each node acknowledges said information the very moment information comprising conditions of other nodes has been received.

In a particular preferred embodiment of the invention, discovery of the conditions of the nodes takes place in the control plane. Automatic discovery is a key feature of the control plane. It can be used to discover the structure of any layer of the data plane. The MTN bus can be seen as a transport entity of the data plane. The data plane provides transfer of user data from one location to one or more other locations. The data plane is layered and comprises e.g. the Generic Framing Procedure (GFP) layer and the Optical Data Unit (ODU) layer. With the automatic discovery procedure it is possible to check the data plane against the control plane.

An additional preferred embodiment of said method according to the invention is characterized in that to discover the conditions of at least one potential link connection between the nodes the data plane is checked against the control plane. Thereby the invention deals with the process for in service layer adjacency discovery for MTN busses. Hereby layer adjacency discovery is defined as a process for deriving an association between two sub-network termination points (SNTP) that form a potential link connection in a particular layer network. The purpose of layer adjacency discovery is to derive all association between two SNTPs that form a potential client layer link connection and are supported by the MTN bus. As the MTN bus can be seen as a number of links from the higher layer perspective, this process will detect all of them, which are able to carry link connections. The term 'in service' relates to the fact that the discovery process is performed in parallel to the user data transfer wherein the information required for discovery is carried in the trail overhead.

A particularly preferred embodiment of said invention is characterized in that a test signal is placed in the GFP layer overhead by the termination functions, to gain a relation between the termination functions and the corresponding termination connection points. This in-band test signal comprises a Termination Connection Point (TCP) identifier of the originating termination function and the control plane address of a discovery agent, located in the control plane, which is concerned with the control of the originating termination function. Upon reception of the test signal at the corresponding termination functions, the receiving node starts to build up a control channel between the discovery agents of the nodes on the control plane. By exchanging Trace Monitor Messages the identity of the test signal placed in the overhead is compared with a trace message specified in the Trace Monitor Message. Thereby it is possible to separate the control plane identifiers from the data plane identifiers. This is compliant to current standards. In a further step the relations between the connection points of the MTN bus are derived by using local knowledge about the status of the adaptation functions.

According to a preferred embodiment of said method according to the invention the Link Management Protocol (LMP) of the control plane is used to detect a bus system in said MTN, wherein to tackle MTN busses the LMP is changed.

In a preferred embodiment of said invention, the MTN bus is realized in a GFP layer that is set upon an ODU layer.

In another preferred embodiment of the invention, said method is performed by a MTN, comprising means to automatically discover the conditions at least of the nodes along the bus and means to exchange information between said nodes, wherein said information comprises said conditions.

Another preferred embodiment of said invention concerns a network node for a MTN, wherein said network node comprises means to automatically discover its conditions, means to receive similar information from other nodes and means to provide other nodes within said multipoint transport network with information comprising at least the conditions discovered and the information received.

DETAILED DESCRIPTION OF THE DRAWINGS

Figure 1:
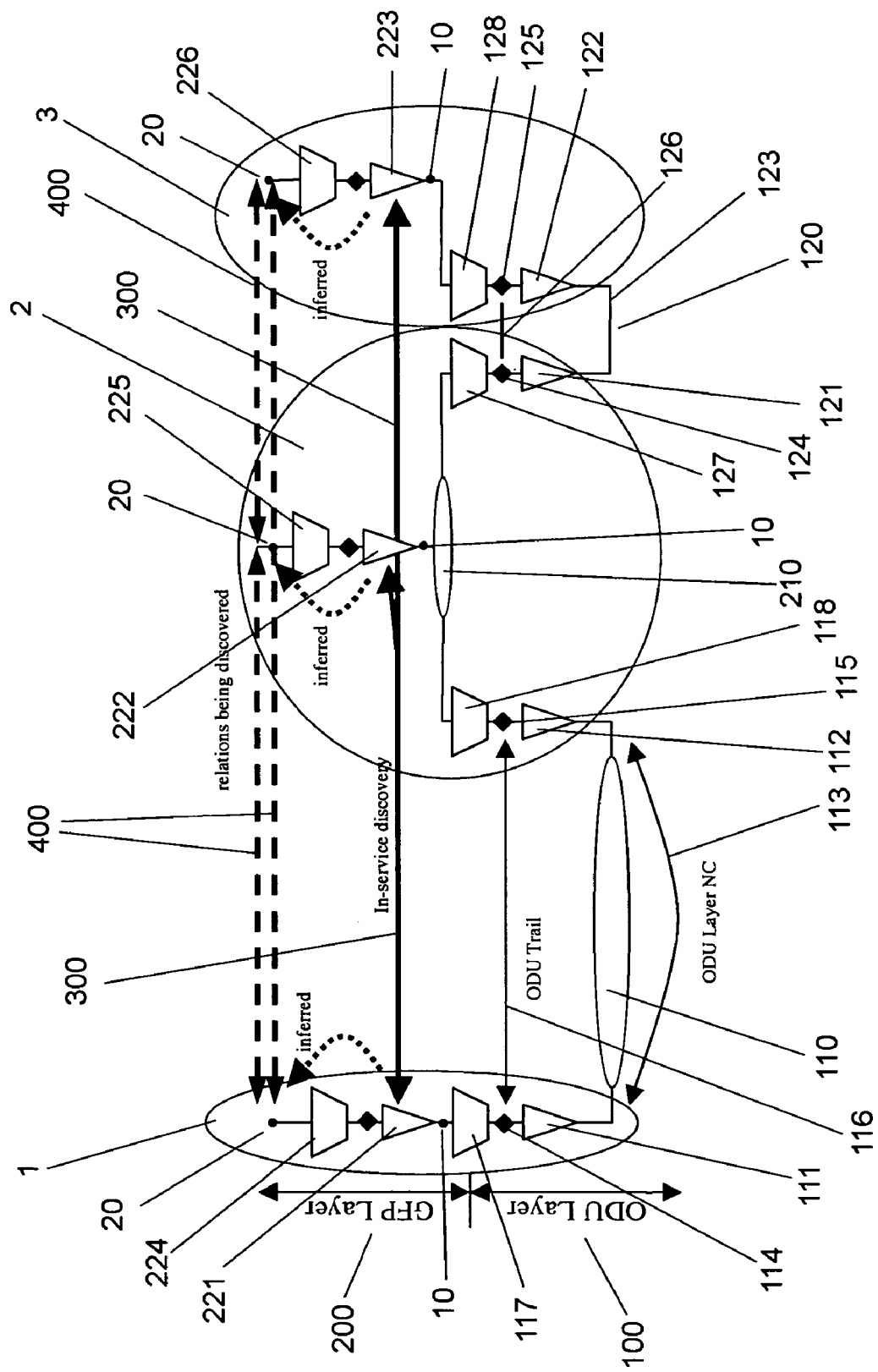
FIG. 1 showing a scheme of in-service discovery for MTN busses.

This invention deals with the process for in-service layer adjacency discovery for MTN busses. Layer adjacency discovery is defined as a process for deriving an association between two sub-network termination points (SNTP), which form a potential client layer link connection in a particular layer network. As the MTN bus is seen as a number of links from the higher layer perspective, this process will detect all of them, which are able to carry link connections. The term 'in-service' relates to the fact that the discovery process is performed in parallel to the user data transfer with the discovery information carried in the trail overhead. In FIG. 1 the MTN bus is realized in the GFP layer 200, which is set-up on an ODU layer 100.

Thereby the lower part of FIG. 1 comprising the ODU handling is completely standard conform (ODU layer 100). On the left side there is an ODU sub network 110 shown with two adjacent ODU termination functions 111, 112. The sub network 110 carries an ODU layer network connection 113. Above the termination functions 111, 112 there are the ODU access points 114, 115, wherein the association between both access points 114, 115 represent an ODU trail 116. The ODU adaptation functions 117, 118 together with the ODU trail 116 form a link in the topology of the GFP layer 200. This link, together with a link on the right side of the diagram, which is constructed in the same manner (ODU sub network 120, termination functions 121, 122, ODU layer network connection 123, ODU access points 124, 125, ODU trail 126, ODU adaptation functions 127, 128) and GFP sub networks 210 are used for a set-up of the MTN bus.

In the GFP layer overhead a test signal is placed by the GFP termination functions 221, 222, 223 to automatically discover a bus system. So first a relation 300 between all GFP termination functions 221, 222, 223 and the corresponding termination connection points 10 is gained.

From this the relations 400 between all connection points 20 of the MTN bus are derived by using local knowledge about the status of the GFP adaptation functions 224, 225, 226. This inference needs a communication between all nodes 1, 2, 3 of the MTN bus concerning the status of the GFP adaptation functions 224, 225, 226. Clearly, a single node only knows the status of its own adaptation function but not the statuses of the adaptation functions of the other nodes.

With the normal discovery of link connections the Link Management Protocol (LMP) is used for this purpose. Here some adaptations are required.

Thereby, in a first step the Termination Connection Point (TCP) to TCP relations have to be detected, which the standard LMP can be used for. But the discovery process needs to be adapted, which is also part of this invention.

Things become more complicated when the client layer link connection 400 needs to be inferred in a second step. This is normally done by the exchange of the LinkSummary messages, which is a service capability exchange and is part of the LMP.

Clearly here significant adaptations need to be performed. The following parameters were identified as required information at the end of the discovery process at each node.

The first parameter to be adapted comprises the MTN bus ID. All nodes need to know that they are part of a certain MTN bus, and thus a MTN bus ID is required that has to be unique for all involved nodes.

The second parameter to be adapted comprises the MTN bus server links. Thereby it is important that it must be known to all nodes which links on the server layer, e.g. the GFP-layer 200 in FIG. 1, are forming the bus. Implicitly, then also the placement of the nodes along the bus is known, which is required for the right initialization of the MTN bus, especially the handling of the time to drop counters (TTD).

The third parameter to be adapted comprises the MTN bus client links. The MTN bus client links are the SNTP to SNTP relations 400, that are the outcome of the discovery process.

Now in a third step a new MTNbusSummaryMessage is formed that has to contain all these parts.

Figure 2:
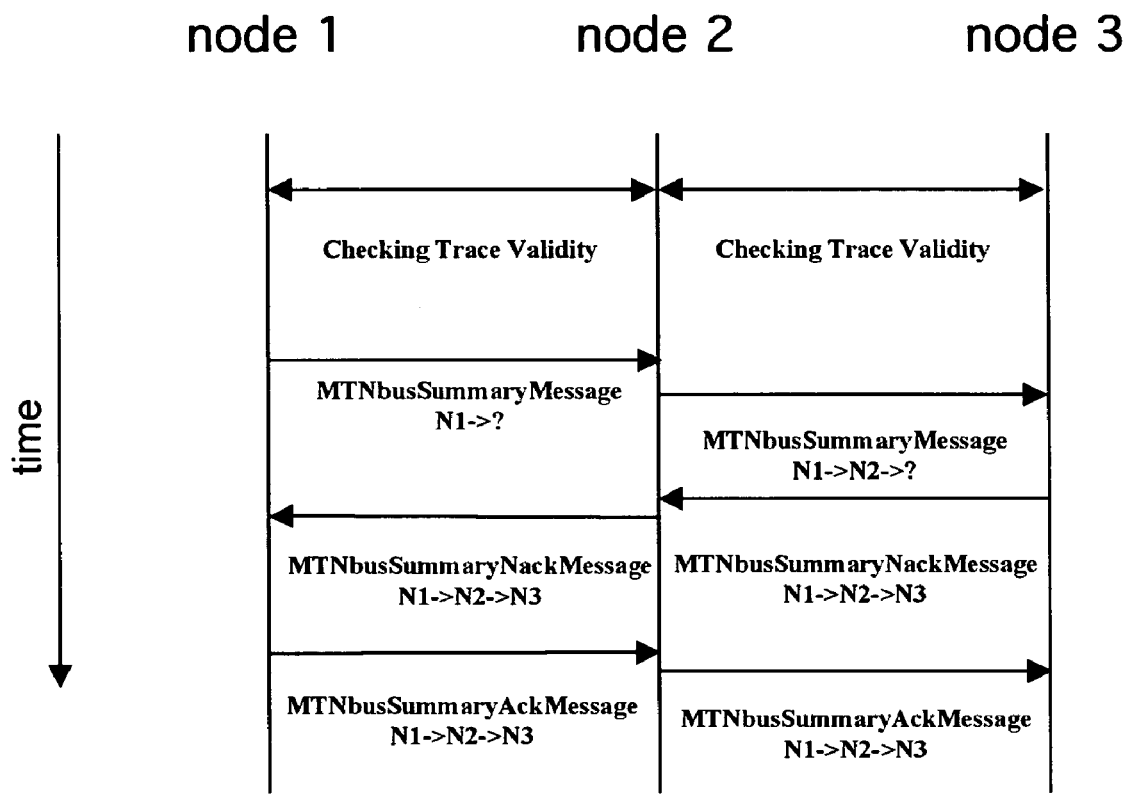
FIG. 2 showing a sequence diagram of the MTN bus discovery.

In FIG. 2 it is shown how this information can be obtained by a suitable discovery process.

If for example node 1 and 2 of an MTN bus are busy with exchanging there service capabilities, node 2 must tell node 1 that it is also possible to reach node 3 on the bus. First node 1 knows from the status of its adaptation functions, that it is the first node on the bus. Then it sends an MTNbusSummaryMessage to node 2, which updates its status and passes a further MTNbusSummaryMessage to node 3, where the link to node 1 is already indicated. Node 3, as the last node on the bus sends an MTNbusSummaryNackMessage back to node 2 indicating which objects need to be changed to include the interface status at node 3. Node 2 updates its database and sends an MTNbusSummaryNackMessage to node 1 indicating the capabilities of node 2 and 3. Then node 1 can confirm the status by sending an MTNbusSummaryAckMessage to node 2, which sends a further MTNbusSummaryMessage to node 3.

The contents of the messages are depicted by for example "N1→?". This means that node 1 sends node 2 the information that it is the first on the bus and tells all interface mappings it has locally.

Doing so, all nodes along the bus act in concert, wherein each node collects information about its conditions and sends that information to the proximate node by the MTNbusSummaryMessage. If that message does not contain all or if it contains wrong parameter values about the MTN bus the receiving node responds with a MTNbusSummaryNackMessage which may include new values for the missing or wrong parameters. This negotiation of parameters may be forbidden by marking some parameters as non-negotiable in the MTNbusSummaryMessage or MTNbusSummaryNackMessage. Upon successful discovery of the MTN bus, each node receives a MTNbusSummaryAckMessage from the proximate nodes, indicating the identity of the parameter values held at there.

Thereby each node that has been provided with information comprised in the MTNbusSummaryMessage provides its proximate node with information comprising the conditions of that particular node plus the conditions of all nodes information has been received from.

Preferably the exchange of information follows a hierarchy beginning at the first node within the bus system. Preferably exchanging of the information begins from the first node to the last node forming the bus and vice versa. It is also thinkable that the nodes between the first and the last node immediately acknowledge the receipt of a particular information by sending back an information comprising the conditions discovered plus the conditions of other nodes received by similar information.

It is best, if the first node on the bus starts the process. However, if it does not, or if a node is added at the beginning of the bus, then there might be more than one MTN bus ID assigned. However, by exchanging the MTNbusSummaryMessage's one can agree on one common ID.

To finally establish the bus system, preferably potential link connections between physically adjacent nodes are chosen, between which nodes no or only few data traffic takes place the very moment automatic discovery of the bus system takes place.

COMMERCIAL APPLICABILITY

The invention is commercially applicable particularly in the field of production and operation of multipoint transport networks for optical and/or electromagnetic data transmission.

LIST OF REFERENCE NUMERALS 1, 2, 3 node
10 termination connection point (TCP)
20 connection point
100 ODU-layer
110, 120 ODU sub network
111, 112, 121, 122 ODU termination function
113, 123 ODU layer network connection
114, 115, 124, 125 ODU access point
116, 126 ODU trail
117, 118, 127, 128 ODU adaptation function
200 GFP layer
210 GFP sub network
221, 222, 223 GFP termination functions
224, 225, 226 GFP adaptation function
300 relation
400 client layer link connection

The invention claimed is:

1. A method for automatically discovering a bus system in a multipoint transport network (MTN), which the MTN is a two-dimensional arrangement of a plurality of nodes, wherein each node potentially can be logically connected with a plurality of physically adjacent nodes via a potential link connection, comprising the steps of:

placing a first test signal in Generic Framing Procedure (GFP) layer overhead by GFP termination functions in order to first gain at least one relation between all GFP termination functions and corresponding termination points;

deriving at least one of the relations between all connection points of the MTN bus by using local knowledge about the status of GFP adaptation functions, which needs a communication between all nodes of the MTN bus concerning the status of the GFP adaptation functions; and employing an adapted link management protocol (LMP) between all connection points of the MTN bus, wherein the LMP is adapted such that the placing step is further defined by detecting Termination Connection Point (TCP) to TCP relations using the standard LMP, the deriving step is further defined by exchanging messages for inferring a client layer link connection, wherein within said messages parameters are adapted in order to provide required information at the end of the, discovery process to each node, and wherein the employing step is further defined by forming a new MTN bus message containing the at least one of the relations and sending the new bus message along the MTN bus, and wherein discovery of conditions of the nodes takes place in the control plane such that to discover the conditions of at least one potential connection between the nodes, the data plane is checked against the control plane.

2. The method according to claim 1, characterized in that exchanging information follows a hierarchy beginning at the first node within said bus system.

3. The method according to claim 1, characterized in that each node acknowledges said information the very moment information comprising conditions of other nodes has been received.

4. The method according to claim 1, wherein the MTN bus is realized in a GFP layer that is set upon an Optical Data Unit (ODU) layer.

5. The method according to claim 1, wherein the messages adapted in the deriving step are further defined by a MTN bus ID, wherein the MTN bus ID is unique for each node of the plurality of nodes, a MTN server link, wherein the MTN server link indicates which links on the server layer such as the GFP layer are forming the bus. wherein the server links also indicate a placement of the nodes along the MTN bus, particularly the handling of time to drop counters, and MTN bus client links.

6. The method according to claim 5, Wherein the MTN bus client links are further defined by sub-network termination point (SMTP) to STMP relations determined by the deriving step.

* * * * *